NOISE SUPPRESSING VIDEO CIRCUIT

Filed Oct. 6, 1959 4 Sheets-Sheet 1

INVENTOR
R. E. GRAHAM
BY A. E. Hirsch Jr.
ATTORNEY

Nov. 14, 1961 R. E. GRAHAM 3,009,016
NOISE SUPPRESSING VIDEO CIRCUIT
Filed Oct. 6, 1959 4 Sheets-Sheet 2

INVENTOR
R. E. GRAHAM
BY C. E. Hirsch Jr.
ATTORNEY

Nov. 14, 1961 R. E. GRAHAM 3,009,016

NOISE SUPPRESSING VIDEO CIRCUIT

Filed Oct. 6, 1959 4 Sheets-Sheet 3

INVENTOR
R. E. GRAHAM
BY A. E. Hirsch Jr.
ATTORNEY

Nov. 14, 1961 R. E. GRAHAM 3,009,016

NOISE SUPPRESSING VIDEO CIRCUIT

Filed Oct. 6, 1959 4 Sheets-Sheet 4

INVENTOR
R. E. GRAHAM
BY A. E. Hirsch, Jr.
ATTORNEY 3,009,016

NOISE SUPPRESSING VIDEO CIRCUIT

Robert E. Graham, Chatham Township, Morris County, N.J., assignor to Bell Telephone Laboratories, Incorporated, New York, N.Y., a corporation of New York Filed Oct. 6, 1959, Ser. No. 844,705
20 Claims. (Cl. 178—6)

This invention relates to electrical communication systems and particularly to methods of and apparatus for removing uncorrelated disturbances such as noise from a communication signal. It has for its principal object the reduction of random noise disturbances in a communication signal, for example, a video signal, while substantially preserving picture quality in such other respects as sharpness, gray scale rendition and the like.

It is evident that under some conditions it is possible to distinguish and separate picture information from random noise in a television image. An observer accomplishes this in some sense when viewing a noisy television picture. It is probable that this performance of the human observer often involves the recognition of high order semantic relationships in pictures. For example, an observer is able to separate noise from a picture of a human face because the image represents a recognizable image; because the viewer has a preconceived idea of what the image should look like. On the other hand, tests of observer ability to predict from context deleted sections of television pictures have shown that much of the time the observer can make effective use of only local and elementary properties of the image, actually performing operations which may be performed readily by simple machines.

Studies of visual perception also indicate the feasibility of selective processing to suppress noise without impairing the perceptually important parts of the picture. For example, it is well known that noise or grain is not very objectionable in regions of fine detail and, indeed, is scarcely detectable even at high levels in chaotic pictorial regions. In these regions the brightness level of the picture varies widely from point to point within a relatively small picture area and within one picture area from frame to frame. Conversely, those parts of a picture in which additive noise tends to be most objectionable are the simply organized regions, e.g., areas having uniform or nearly uniform brightness or perhaps only one-dimensional variations in brightness. This is the expected result since an analysis of characteristic noise disturbances indicates that noise disturbances resemble closely the picture variations which occur in the chaotic regions. Such perceptual properties provide a basis for effectively discriminating between noise and picture without limiting the choice of picture material.

It is another object of the present invention to turn these observations to account in a completely automatic operation thereby effectively to obtain a useful degree of separation between a desired portion of an image signal and noise perturbations which may accompany it. Since local operations of the sort performed by a human observer in distinguishing between noise disturbances and picture material have been found to be easily transformed into automatic operations, it is in accordance with the present invention to perform local tests on a video signal to detect the presence of perceptually significant picture detail in a number of different categories. For example, tests are employed to determine whether or not the brightness points of the corresponding picture region are simply organized, that is, whether the picture region exhibits such properties as approximately uniform brightness, a planar variation in brightness, or a variation in brightness along only one direction. In particular, features are tested for which both are characteristic of the communication signal and are of substantial importance to the ultimate consumer. Depending upon the test results, one of a number of available smoothing constraints is employed to reduce materially noise perturbations in the signal. With an appropriate selection of the constraints, the essential features of the signal remain unaltered but signal components alien to those features are effectively suppressed or removed. When the tests show an absence of simple organization, indicating regions of complex detail, then no smoothing is performed since the noise effects are not readily perceived by a viewer in such regions. In contrast to various known systems for limiting or reducing noise in a communication signal, which typically alter the signal for unexpected fluctuations, the present invention leaves the signal unaltered whenever the diagnostic tests reveal the presence of significant point-to-point changes or second order differences.

Other objects, features, the nature of the present invention and its various advantages will be more fully understood upon consideration of the appended drawings and the following detail description of the drawings. In the drawings.

PRELIMINARY CONSIDERATIONS

Before proceeding to a discussion of the apparatus for signal processing in accordance with the invention, it is desirable to establish certain categories of signal organization that are simple enough that the associated smoothing constraints provided by the selected smoothing mode will strongly reduce chaotic perturbations and that the decision criteria themselves are meaningful in the presence of noise; categories which at the same time are adequate to provide an acceptable match to the signal in regions where unsmoothed noise would normally be objectionable. The degree to which it is possible to meet these requirements determines, of course, the effectiveness of the signal processing. For convenience and simplicity of presentation, the processes to be discussed hereinafter will be confined to operations on samples of a communication signal taken at the so-called Nyquist rate, i.e., at a rate equal to $1/2W$ where W is the bandwidth of the signal. Other sampling rates or sample values appropriate to the class of signals involved may, of course, be selected for use without departing from the scope of the present invention. Although the discussion that follows is directed specifically to video signal processing, the general principles of the invention are, of course, also applicable to other communication signals.

Figures 1, 2, 3:
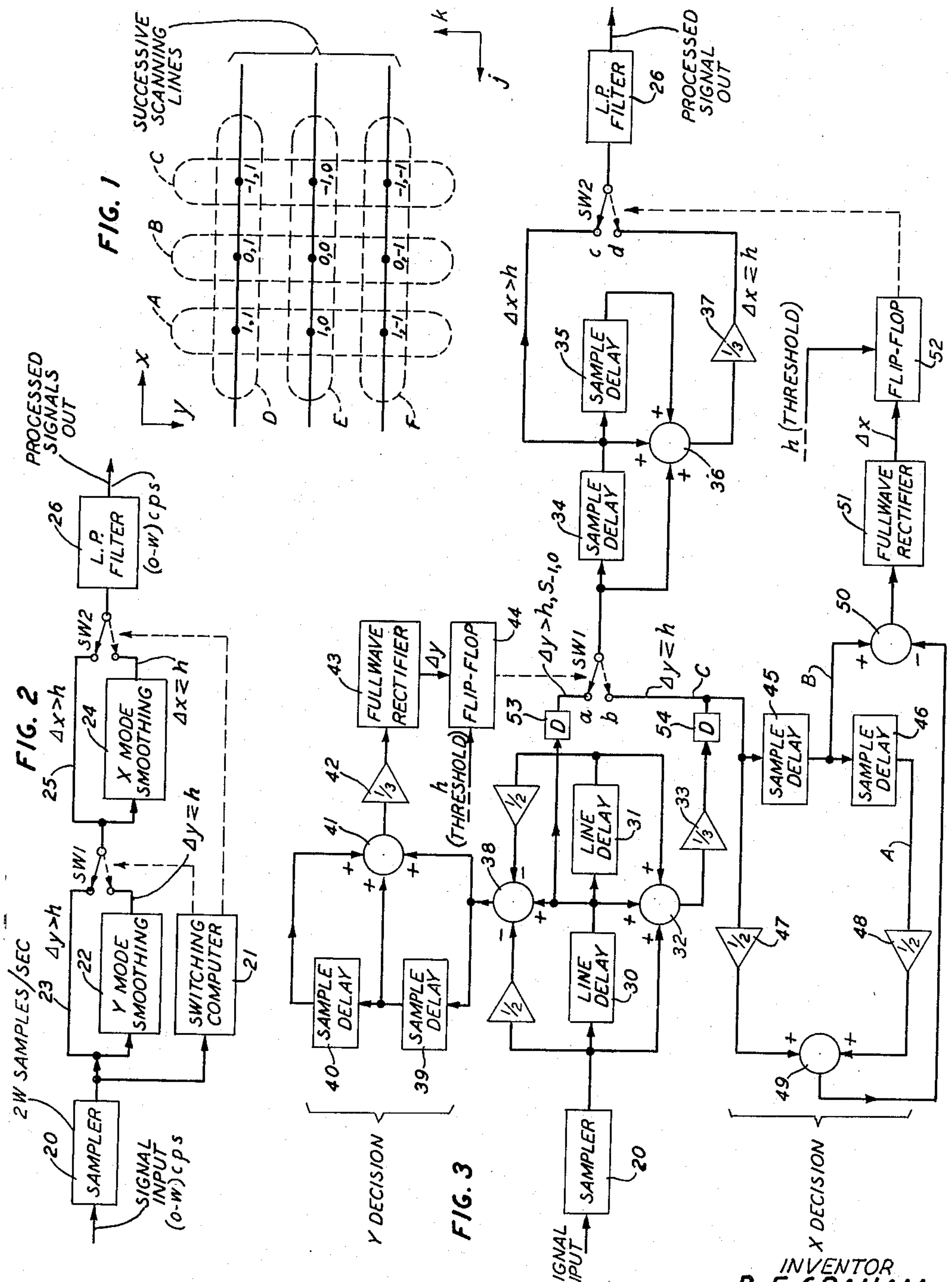
FIG. 1 shows a matrix of samples of a communication signal, for example, samples of a picture signal, situated on three successive scanning lines and the designations used to identify them.
FIG. 2 is a block schematic diagram showing signal processing apparatus in accordance with the present invention.
FIG. 3 is a block schematic diagram showing circuit details of the processing apparatus of FIG. 2.

Categories of pictures organization may be established conveniently through an examination of a matrix of samples of a video signal. FIG. 1 shows a 3 by 3 matrix of Nyquist interval samples superposed on three successive lines of a television scanning raster. The nine sample positions are labeled in terms of a moving coordinate system whose origin 0,0 is taken to be centered on the scanning point. Six subgroups are designated; each of the labels A, B, C, D, E, and F represents the sum of three sample values, e.g., $A=S_{1,-1}+S_{1,0}+S_{1,1}$. From a matrix of this form two measures of "flexure" are defined as follows:

$$\Delta_x=\frac{1}{6}|A+C-2B|$$

$$\Delta_y=\frac{1}{6}|D+F-2E| \quad (1)$$

$\Delta_x$ and $\Delta_y$ are finite-difference approximations to the second derivatives of the picture brightness surface with respect to $x$ and $y$ displacement of samples from the scanning point, respectively. The measure, $\Delta_x$, is formed from averages of three samples in the $y$ direction, and $\Delta_y$ correspondingly is formed from averages of three samples in the $x$ direction. Transverse smoothing of this sort is provided to reduce the effects of noise on the flexure measurements. If the individual samples are perturbed, for example, by a white Gaussian noise of R.M.S. value, $m$, then the R.M.S. value of the corresponding perturbations in $\Delta_x$ or $\Delta_y$ will be $m/\sqrt{2}$. Without the transverse smoothing, the $\Delta$ perturbations would have been $m\sqrt{3}/\sqrt{2}$.

The measures of flexure, $\Delta_x$ and $\Delta_y$, are independently compared with an arbitrary signal level selected as an indication of the minimum signal brightness variation that is to be considered as representing perceptually important detail in the picture. This signal level, termed the threshold level and designated conveniently $h$, is typically a small fraction of the video signal range but may be adjusted to assume a value commensurate with the extent of noise reduction desired or to otherwise accommodate a wide variety of signal forms. Preferably, the same threshold value is used for each measure of flexure but, of course, the value of $h$ for vertical flexure need not be the same as that used for the horizontal measure of flexure in a picture signal. If both of the flexure measures are found to exceed the threshold level, indicating a region of complex detail, the existing sample value is transmitted without alteration. In this case accompanying noise is least objectionable and no attempt is made to remove it. To the contrary, if one or both of the measures of flexure are found to be less than the threshold level, the local picture area apparently is simply organized; i.e., it has approximately uniform brightness, a planar variation in brightness, or one-dimensional variations in brightness. In such regions noise disturbances are most objectionable. Hence, an appropriately designed smoothing filter is inserted in the circuit to reduce the noise perturbations.

Conveniently the signal is filtered or smoothed by forming an average of it and a number of nearby samples, e.g., the samples surrounding the present value sample $S_{0,0}$ in the matrix of FIG. 1. A number of possible average values may be formed, if desired, and ancillary tests made to determine which of the average values is likely best to represent the value of the present sample. The following table lists possible test result, the indicated characteristics of the local brightness surface of the picture, and the noise reductions provided by corresponding selected averaging or smoothing processes. For illustrative purposes, three modes of smoothing are indicated.

*Table 1.—Signal processing modes*

| Test result | Local surface property | Smoothed value substituted for $S_{0,0}$ | Noise reduction |
|---|---|---|---|
| $\Delta_x \lesseqgtr h$ ; $\Delta_y < h$ | Planar | $\frac{A+B+C}{9}$ | 10 db. |
| $\Delta_x > h$ ; $\Delta_y < h$ | Flexure in x direction only | $\frac{B}{3}$ | 5 db. |
| $\Delta_x \lesseqgtr h$ ; $\Delta_y > h$ | Flexure in y direction only | $\frac{E}{3}$ | 5 db. |
| $\Delta_x > h$ ; $\Delta_y > h$ | Flexure in both directions | $S_{0,0}$ | 0 db. |

In the planar mode the original value $S_{0,0}$ is replaced by the average of all nine samples of the matrix. Assuming the noise samples to be uncorrelated the use of the 9-point average is equivalent to substituting for the sample $S_{0,0}$ the plane which fits the nine points with the least mean square error, and then using the ordinate value of the plane at the location 0,0. This averaging process provides approximately 10 db of noise reduction (this is actually the reduction in R.M.S. noise which would result if the system were locked in the planar mode), and, to the degree that the local brightness surface is truly a plane, does not alter the noise-free picture content. The next two modes employ 3-point averages, and each afford noise reductions of 5 db, again without effect on picture content having precisely the indicated properties. In the final example, where the flexure exceeds the threshold in both directions, no averaging is permitted and no noise suppression obtained.

The magnitude of the threshold value, $h$, determines the degree to which the received signal can depart from a nominal surface category before the corresponding smoothing constraint is abandoned. The larger the value of $h$, the more the system insists on smoothing, thereby tending to reduce noise more effectively but running a greater risk of degrading the picture. It has been found that a substantial reduction in apparent noise is obtained with a threshold setting of about three percent of the video range for pictures with a signal-to-noise ratio of about 34 db, and of about six percent for a ratio of 28 db, with little effect on image sharpness.

Due to the transverse smoothing employed in obtaining the flexure measures $\Delta_x$ and $\Delta_y$, the decision procedure tends to ignore, and thus smooth out, isolated point-to-point changes to a greater degree than transitions comprising extended edges or lines. For example, if the decision threshold $h$ is set at 2 percent of the video range, noise-free vertical edge transitions as large as 5.4 percent and isolated brightness impulses as large as 14 percent may occasionally be degraded by the processing. This preferential treatment afforded edges is reasonable, particularly in view of their perceptual importance and relatively frequent occurrence compared with single dots or isolated steps in brightness.

It has been found that a better balance between the amount of blurring imparted to the picture and the degree of noise suppression that may be realized is obtained by appropriately weighting the sample values in forming the average value signals rather than by the simple averaging described above. An example of a tapered array of weighting factors for the nine points in the matrix of FIG. 1 is as follows:

$$\begin{matrix} .25 & .5 & .25 \\ .5 & 1.0 & .5 \\ .25 & .5 & .25 \end{matrix} \quad (2)$$

This tapered array yields within 0.5 to 1 db of the noise reduction obtained with uniform weighting and, moreover, results in less objectionable blurring for a given threshold value.

APPARATUS

FIG. 2 illustrates by way of a block diagram, apparatus for processing a communication signal, e.g., a video signal, in accordance with the principles of the invention. Logical tests of the type described above are performed upon an applied video signal and in accordance with the test results a selected smoothing operation is employed to suppress undesired noise. It is in accordance with the invention to leave the signal unaltered whenever the diagnostic tests reveal the presence of significant point-to-point changes or second order differences which indicate fine picture detail. In the apparatus of FIG. 2 uniform weighting of the signal samples is assumed for simplicity. Moreover, since the operation previously described can be factored approximately into successive x and y operations, ignoring certain transitory effects which occur whenever a change is made in the selected *y* smoothing mode, a tandem arrangement is illustrated in place of the exact but more general plan in which all of the points in the matrix are established as individual circuit modes in a storage array or the like and then utilized in the various required combinations.

The incoming continuous signal is first sampled at about the Nyquist rate in sampler 20. A higher sampling rate may, of course, be employed if closer spaced points in the matrix are used or if more frequent mode decisions are desired. At each sampling instant a switching computer 21 sets switch SW1, depending on the magnitude of $\Delta_y$, to pass sampled signals which have either been smoothed in mode filter 22 or have been passed through direct connection 23 without smoothing. Simultaneously the computer selects the processing mode for the *x* direction according to the magnitude of $\Delta_x$ and sets switch SW2 accordingly. Signals passed by switch SW1 thus are either passed through *x* smoothing filter 24 or directly through connection 25 to a low pass filter 26. The low pass filter 26 is used to smooth out the samples and yield a continuous processed signal. If, for example, the switching computer calls for smoothing in both directions, the 9-point average is obtained as indicated in Table I. For other choices, the remaining contingent operations outlined in Table I are produced. Actually this is precisely true, as previously suggested, only in the steady-state condition, i.e., when the *y* smoothing decision has remained the same for several, e.g., three, consecutive decision periods. In practice, fixed delays (not shown) are provided in the straight-through branches 23 and 25 to match the delays resulting from the smoothing operations.

FIG. 3 shows in greater detail the system of FIG. 2. In the figure, signals are applied by way of sampler 20, television line delay element 30 and sample delay element 53 to one terminal *a* of the switch SW1. This signal represents the sample $S_{-1,0}$ in the matrix of FIG. 1. Connected in tandem with relay line 30 is an identical delay line 31 also arranged to provide a delay of one television line interval. With this arrangement of delay elements, the three sample points occurring in the same relative time position in each of three successive scanning lines are established; one at the input of delay line 30, one at the junction of delay lines 30 and 31 and the other at the output of delay line 31. An average of the three samples is obtained by adding them together in adder 32, dividing the total by three, e.g., by passing the resultant signal through amplifier 33 whose gain is adjusted to one-third, and passing the adjusted signal through sample delay elements 54. The resultant average signal is applied to the second terminal *b* of switch SW1. Accordingly, the two signals applied to the input terminals of SW1 represent at terminal *a*, an unmodified samples $S_{-1,0}$, and at terminal *b* he average of the three vertically contiguous samples of column C in FIG. 1.

These samples are passed next to a network including sample delay line 34 tandemly connected to sample delay line 35. Signals derived from the junction of these delay lines are passed directly to terminal *c* of SW2 and constitute an unmodified version of the signals supplied by SW1. A sample representing the average of three adjacent samples supplied by SW1 is produced by adding the samples available at the input to delay line 34, at the output of delay line 35 and the sample derived from the midpoint of the two lines in adder 36 and dividing the resulting sum by one-third, as, for example, in an amplifier 37 whose gain is adjusted to one-third. The averaged signal is applied to the second terminal *d* of SW2. In dependence upon the switch position, either the unmodified samples or the averaged samples are passed to low pass filter 26 which is provided effectively to smooth the samples to form a continuous output signal. Thus, if SW1 is in switch position *b* and SW2 is in position *d*, the signal supplied to filter 26 is an average of all nine samples of the matrix. If SW1 is in switch position *a* and SW2 is in position *d*, the average of samples in row E is supplied instead to the filter 26. These examples hold true, of course, only in the steady-state condition; that is, when the *y* smoothing decision has remained the same for several consecutive decision periods.

The switches SW1 and SW2 may be fully electronic switches of any type well known in the communications art. They are set to pass unmodified samples or averaged samples in accordance with the detected presence of perceptually important picture detail in the input samples. This decision is made by switching computers which provide activating signals for operating the switches. Considering now the Y mode computer for energizing SW1, the sample points in a vertical group are applied to subtractor 38. These samples are, of course, available from the delay lines 30—31 network as before. In order to obtain a measure of flexure of a column, e.g., C, an average signal is obtained equal to the difference of the center sample (−1,0) of the column, and one-half of the sum of the adjacent points (−1,1) and (−1,−1). This column flexure signal is averaged over three columns by passing the samples through sample delay lines 39 and 40, by adding the three signals together in adder 41 and passing them through amplifier 42 with a gain of one-third. A signal proportional to the magnitude of the resulting averaged signal is obtained in full wave rectifier 43; it represents the required measure of flexure in the *y* direction, i.e., it constitutes $\Delta_y$. Both the flexure signal $\Delta_y$ and the threshold value signal *h* are applied to the keyed flip-flop 44. Flip-flop 44 is preferably arranged to produce an output signal sufficient to shift the movable arm of switch SW1 from altered samples, to its other position *b*, providing a path for average value samples, whenever the flexure signal $\Delta_y$ is less than or equal to the threshold level *h*. For values of $\Delta_y$ less than or equal to *h* a simply-organized signal is indicated which is amendable to smoothing. Should the flexure signal $\Delta_y$ be greater than *h* the flip-flop output is insufficient to activate switch SW1 and no smoothing is obtained.

In similar fashion an *x* flexure signal is produced for actviating SW2. In this case an average smoothed sample representative of the samples of column B is compared with the averages of the adjacent columns A and C in the matrix of samples. This may be done by passing the smoothed sample from sample delay element 54 through sample delay lines 45 and 46 to produce at the inputs to amplifiers 47 and 48 the flanking average samples A and C, and at the junctions of delay lines 45 and 46, the center average sample B. The flanking average samples are further averaged by passing them through amplifiers 47 and 48 respectively and adding them together in adder 49. This average signal is then subtractively compared to the midpoint signal in subtractor 50. The output of the subtractor represents, therefore, $$\frac{1}{3}\left(B-\frac{A+C}{2}\right)$$

A signal proportional to the magnitude of this flexure parameter is developed in full-wave rectifier 51. It constitutes the measure $\Delta_x$ and is applied to flip-flop 52. In dependence on the magnitude of the average flexure parameter magnitude, $\Delta_x$ and the applied threshold signal $h$, a signal is produced by flip-flop 52 sufficient to activate SW2. If the flexure signal $\Delta_x$ is less than or equal to the threshold $h$, the arm of SW2 is pulled from the terminal $c$ to the terminal $d$ and $x$ smoothing is obtained.

Figure 4:
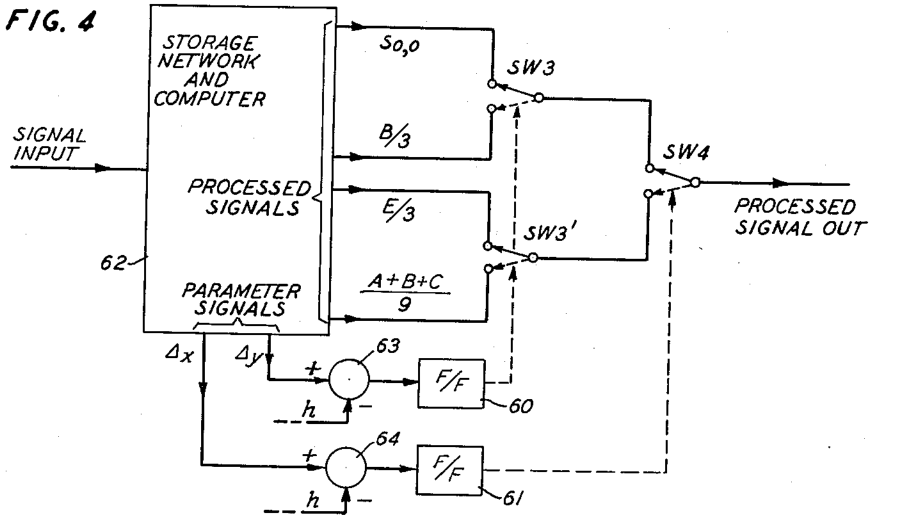
FIG. 4 is a block schematic diagram which shows apparatus for processing picture signals without sampling in accordance with the invention.

An example of apparatus for processing unsampled signals is illustrated in FIG. 4. The operations are identical with those previously described in Table I except that the flip-flops 60 and 61 controlling the switches SW3—SW3′ and SW4, respectively, are preferably adjusted to have a refractory time on the order of $1/2W$ where W is the signal bandwidth. With this refractory time the resulting operations will, of course, be stationary but successive switching decisions will be spaced by at least $1/2W$ seconds. In the apparatus of FIG. 4, signals applied to storage network and computer 62 are stored and grouped in accordance with the pattern of FIG. 1 on a continuous signal basis. Accordingly, at the output of computer 62 the signals $S_{0,0}$, and the averages $B/3$, $E/3$ and $$\frac{A+B+C}{9}$$

are available. $S_{0,0}$ representing the unmodified signal and $B/3$ representing an average signal in the horizontal direction are applied to the terminals of SW3. Average signals $E/3$ and $$\frac{A+B+C}{9}$$

constituting smoothed signals in the vertical, and both horizontal and vertical directions, respectively, are available at the terminals of SW3′. For $\Delta_y$ greater than $h$, indicative of a complex picture region, $S_{0,0}$ and $E/3$ are passed by switch SW3–3′ to the terminals of SW4. For $\Delta_y$ less than or equal to $h$ average signals $B/3$ and $$\frac{A+B+C}{9}$$

are available at the terminals of SW4. SW4 permits one or the other of the available signals to be passed as a processed output signal. The energizing signals for activating switches SW3–3′ and SW4 are produced by forming signal values $\Delta_x$ and $\Delta_y$ in accordance with Equation 1. These are compared with threshold level signal $h$, for example, in subtractors 63 and 64 whose outputs energize flip-flops 60 and 61.

OPERATION BY SUBSTITUTION OF PROCESSED PAST SAMPLES

It has been found that the apparatus previously described provides a net improvement in image quality for moderate noise levels, e.g., for signal-to-noise ratios on the order of 34 db (peak signal vs. R.M.S. noise) but is somewhat lower in effectiveness at signal-to-noise ratios of 28 db or less. The perturbing effect of noise on the mode selecting decisions when the threshold $h$ is set low enough to respond to weak but significant features of the picture appears to be largely responsible for this inefficiency. It has been observed experimentally that some benefit is obtained by using already processed and hence presumably quieter samples both in making the decisions and in forming the desired filtering or smoothing combinations. Thus, in the sample matrix of FIG. 1, four of the nine points, e.g., 1,0 plus all of the samples of group D represent past sample points with respect to sample $S_{0,0}$. These points may therefore be used advantageously in processing of later samples.

Figure 5:
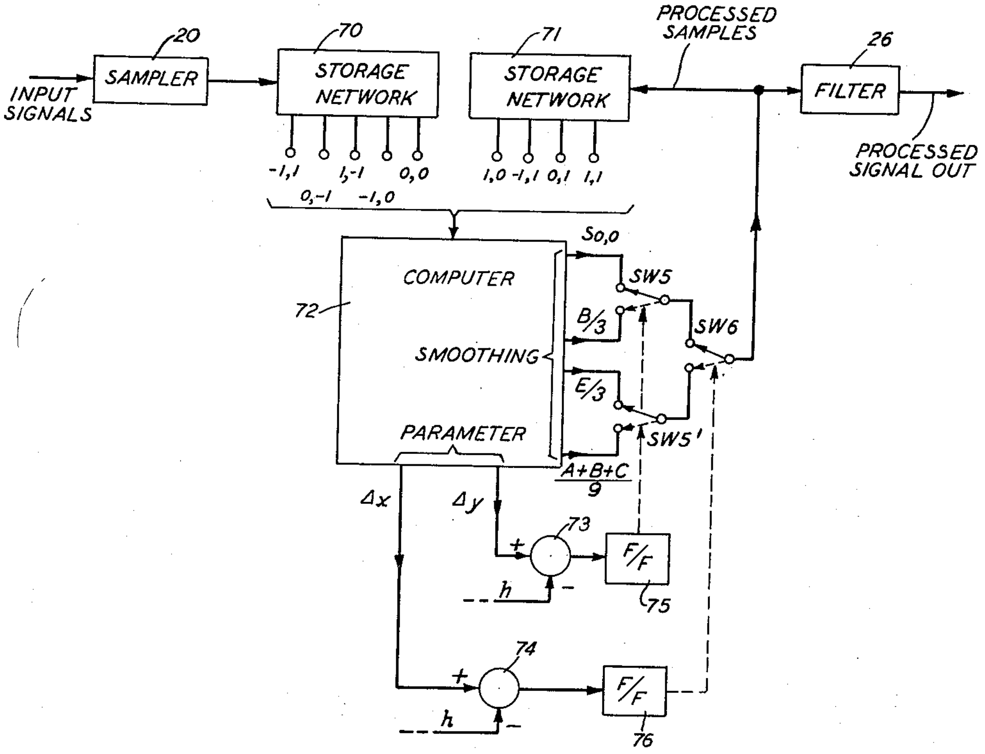
FIG. 5 is a block schematic diagram showing the details of a processing system in which previously processed samples are utilized.

FIG. 5 shows an appropriate arrangement for making use of processed past samples and uniform weighting of the matrix points. The apparatus is similar to that of FIG. 4 but includes two separate storage networks for establishing the matrix points. A five-point network 70 is employed to provide the designated samples of the matrix of FIG. 1 prior to processing and a four-point network 71 for providing the stored processed samples. Simple delay networks such as those illustrated in FIG. 3 are sufficient to provide the necessary samples. The outputs of the two networks 70 and 71 are applied to the input of a smoothing and parameter computer 72 which provides at its output terminals properly weighted sample values constituting the smoothed output signals and additionally the parameter signals $\Delta_x$ and $\Delta_y$ which in turn are compared against the threshold signal $h$ in subtractors 73 and 74. For values of the parameter signals which fail to exceed the threshold, flip-flops 75 or 76 are activated which in turn energizes one or the other or both of the switches SW5 and SW6. The final processed signals appearing at the output of SW6 are fed both to the output filter 26 and to the input of storage network 71. The smoothed signals comprising appropriately weighted groups of signals A, B and C appearing at the output of computer 72 are defined as before on the matrix points indicated in FIG. 1 but now represent composite sums including both processed and unprocessed values. For example, $A=S'_{1,1}+S'_{1,0}+S_{1,-1}$, where S′ denotes a processed sample. With this change in symbol interpretation the flexure parameters $\Delta_x$ and $\Delta_y$ are again given by Equation 1.

Experimental results indicate that the "smoothed past" system of FIG. 5 yields somewhat better noise suppression, for a given amount of picture blurring, than the system of FIG. 3. For a 34 db signal-to-noise ratio, pictures processed by the apparatus of FIG. 5 appear to possess significantly less noise at any given threshold value, and appear only slightly more blurred than those produced by the apparatus of FIG. 3. However, the apparatus of FIG. 5 appears to have but little advantage in suppressing the noise without degrading the picture when the noise level is high. This can be rationalized somewhat by noting that for excessive noise the pattern of decisions may well be such that the so-called "smoothed" past is in fact unsmoothed and thus the modified process acts substantially as does the former one. In areas where the noise-free picture brightness is constant, it would normally be expected that the feedback provided by the smoothed past system would exhibit a fairly sharp change in behavior as the noise level is increased. At low levels the probability of smoothing is high at any given time and the processed past would normally be quiet, thus increasing or sustaining the high probability of continued smoothing. At high noise levels, however, the smoothing probability is always low so that the process seldom achieves the quieted past condition necessary to improve the operation. Variations in the exact program followed are of course possible. Thus, the processing may be arranged so that the computing and smoothing matrix 72 includes only past points, except for the one present point $S_{0,0}$. Alternatively, continued decisions to smooth may be made to establish an expanding past interval over which the smoothing takes place.

CONSISTENT DECISION OPERATION

The processing apparatus described above for producing appropriate smoothing decisions in the presence of noise disturbances exploit the disorganized nature of noise but only in a way that is completely dependent on noise magnitude. It is desirable, however, to detect the presence of perceptually significant picture detail in a signal regardless of the magnitude of the accompanying noise components. A degree of independence from noise amplitude may be achieved by making a series of subdecisions and then an over-all decision based on consistency among the subdecisions rather than by making a single flexure test in the fashion described above. Specifically, in the apparatus of FIG. 3 a horizontal flexure parameter $\Delta_X$ is formed by effectively superposing the horizontal arrays D, E and F and then by making a single flexure test on a composite three-point array. Improved operation is achieved by forming separate flexure parameters for the samples in rows D, E and F as follows:

$$\Delta_D = S_{0,1} - \frac{S_{1,1} + S_{-1,1}}{2}$$

$$\Delta_E = S_{0,0} - \frac{S_{1,0} + S_{-1,0}}{2}$$

$$\Delta_F = S_{0,-1} - \frac{S_{1,-1} + S_{-1,-1}}{2} \qquad (3)$$

Unlike the parameter $\Delta_X$ previously employed, these parameters may be either positive or negative. Once the flexure parameters have been obtained, a series of ternary decisions are made by comparing these parameters against both positive and negative thresholds, i.e., against a threshold $\pm h$. For example, the decision values, $d_D$, for $\Delta_D$ may be:

$$d_D = 0 \qquad |\Delta_D| < h$$

$$d_D = 1 \qquad |\Delta_D| > h,\ \Delta_D > 0$$

$$d_D = -1 \qquad |\Delta_D| > h,\ \Delta_D < 0 \qquad (4)$$

Similarly, decision values for $d_E$ and $d_F$ may be obtained by comparing the appropriate parameters against positive and negative values of the threshold. Evidently there are twenty-seven possible values for the decision triplet $d_D$, $d_E$, and $d_F$. For convenience of instrumentation the possible values attainable are divided into two groups, a "consistent" group for $d_D$, $d_E$, and $d_F$=1,1,1 or −1,−1, −1, and a "random" group for the remaining possible combinations. For decision values occurring in the first category, it is assumed that perceptual significant flexure is present and that smoothing is not necessary. For the remainder it is assumed that the local pictorial content is planar and that smoothing is required to reduce the accompanying noise. The following table summarizes the operating rules.

*Table II*

| Decision | | | Results | | | Value substituted for $S_{0,0}$ |
|---|---|---|---|---|---|---|
| $d_A$ | $d_B$ | $d_C$ | $d_D$ | $d_E$ | $d_F$ | |
| 1 | 1 | 1 | 1 | 1 | 1 | $S_{0,0}$ |
| 1 | 1 | 1 | −1 | −1 | −1 | |
| −1 | −1 | −1 | 1 | 1 | 1 | |
| −1 | −1 | −1 | −1 | −1 | −1 | |
| 1 | 1 | 1 | [1] | [1] | [1] | $\frac{E}{3}$ |
| −1 | −1 | −1 | [1] | [1] | [1] | |
| [1] | [1] | [1] | 1 | 1 | 1 | $\frac{B}{3}$ |
| [1] | [1] | [1] | −1 | −1 | −1 | |
| [1] | [1] | [1] | [1] | [1] | [1] | $\frac{A+B+C}{9}$ |

[1] All others.

Figure 6:
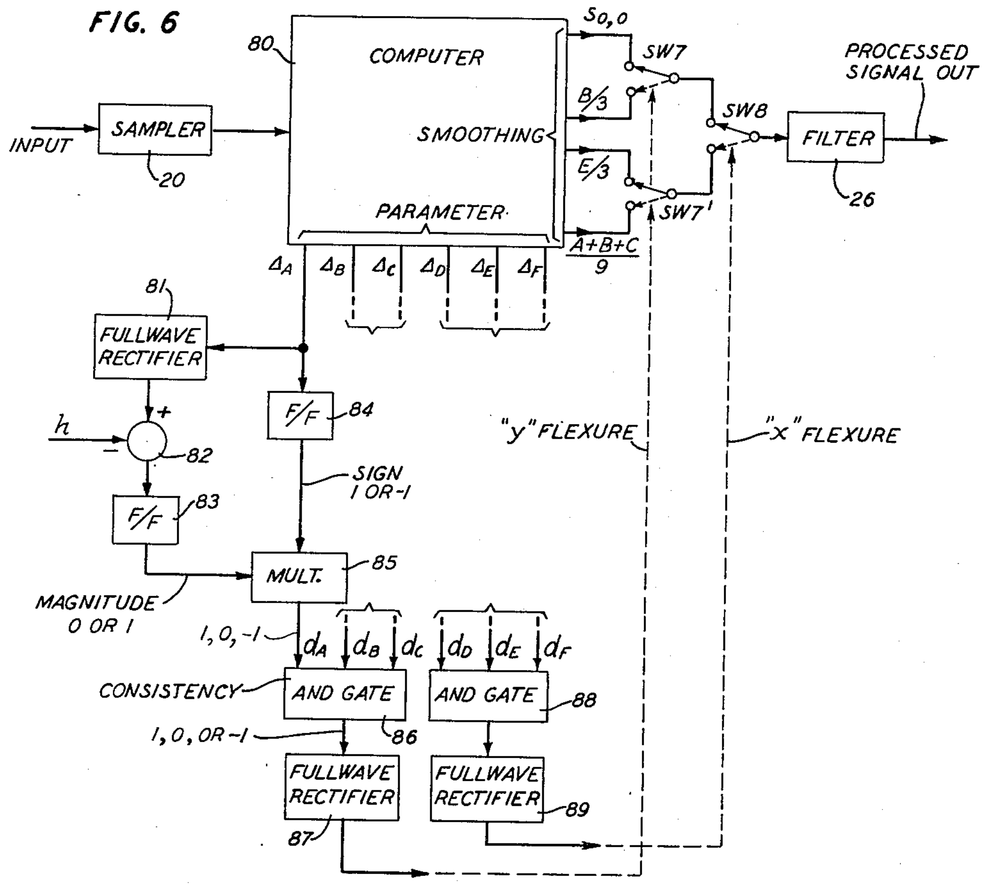
FIG. 6 is a block schematic diagram of apparatus which is a variant of that of FIG. 2.

Apparatus for implementing the operations of Table II are shown in FIG. 6. The system of FIG. 6 is basically similar to that of the previous figures but employs a smoothing and parameter computer 80 of somewhat more complex construction than previously described. The computer 80 need include however only a matrix of delay elements for providing the indicated smoothing signals and parameter values. The operation for obtaining a subdecision from the corresponding flexure parameter is indicated in detail for $\Delta_A$. Apparatus for performing the corresponding operations for each of the other flexure parameters is not shown but is in all respects identical.

Each flexure parameter signal $\Delta_A$, $\Delta_B$ and $\Delta_C$ is individually processed to establish both its magnitude and sign. Only in the event that the flexure is found to be "consistent" among the subgroups or columns of points, i.e., is of sufficient magnitude and has the same sign for all similarly oriented subgroups in the matrix, is a parameter signal produced sufficient to effect smoothing. To establish this measure of consistency, each parameter signal, e.g., $\Delta_A$, is passed through a full wave rectifier 81 to eliminate sign differences and compared with a threshold level signal $h$ in subtractor 82. The difference signal is passed through flip-flop circuit 83 to produce a two-value signal in which one level such as that represented by a positive signal of a given level denotes that the parameter $\Delta_A$ is greater than the threshold value $h$ and that a signal of some other magnitude or preferably of zero magnitude denotes that the parameter signal is less than or equal to the threshold. The parameter signal $\Delta_A$ is also applied to flip-flop 84 which is arranged to respond to signals of one polarity only. Conveniently, it may be arranged to emit for positive inputs a +1 signal and a −1 signal for all other values, that is, for zero or for negative parameter values. The product of the two signals representing sign and magnitude is obtained from the multiplier 85. Evidently the product is either 0, +1 or −1; it is denoted a subdecision signal and designated $d_A$ or the like. Subdecision signals $d_B$ and $d_C$ for parameter signals $\Delta_B$ and $\Delta_C$ are applied together with subdecision signal $d_A$ to AND gate 86 which produces a non-zero output only when three subdecision signals are identical and not zero, i.e., all three signals are +1 or all three are −1. The output of gate 86 is zero for all other combinations. Full wave rectifier 87 transforms the signals so produced into a unipolar signal which constitutes the "$y$" flexure signal and is utilized to operate SW7–7′. Similar operations are performed on the horizontal parameter signals $\Delta_D$, $\Delta_E$ and $\Delta_F$ yielding at the output of AND gate 88 and rectifier 89 the "$x$" flexure signal which is utilized to operate SW8.

Figure 7:
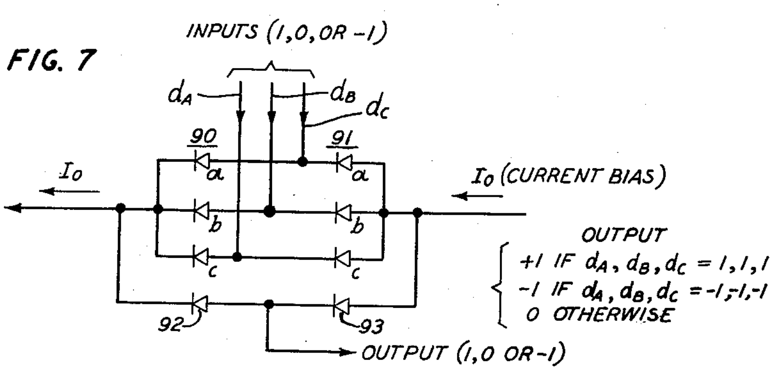
FIG. 7 is a schematic circuit diagram showing details of the apparatus of FIG. 6.

Details of the AND gates 86 and 88 are shown in FIG. 7. Diodes 90*a*, *b*, *c* and 91*a*, *b*, *c* are biased suitably by a current $I_0$ and supplied at the respective junctions with signals from three multipliers, viz: multiplier 85 and corresponding multipliers in the channels for $\Delta_B$ and $\Delta_C$. An output is produced only if the bias of three diodes of the same polarity is overcome simultaneously. In that event, consistency among the three parameters is assumed and the computer output signal is passed either through isolation diode 92 or diode 93 to form, after rectification, a flexure signal suitable for activating one of the electronic switches.

It has been found that throughout a very considerable range of threshold-to-noise ratios the test for consistency among a number of noisy individual decisions results in fewer errors in failing to smooth than does a test based on a single quieter decision. It has also been noted that in the consistent decision method of operation shown in FIG. 6 the threshold value may be arbitrarily reduced to zero with the resulting probability of failure to smooth becoming only 0.25. This implies, conversely, that the noise present in a system of this sort may be increased greatly with only a limited increase in failures to smooth simply organized picture regions. Under these conditions the smoothing criterion is simply the presence or absence of a pattern of consistent polarity of flexure, without regard for magnitude.

Although the consistent-decision method of FIG. 6 represents an improvement in some ways over the single decision process in the case of a noise free picture, perceptually important picture detail may nevertheless fail to meet the test for consistency and be degraded by the consequent smoothing operation. Even if the threshold parameter is reduced to zero the detail may fail to meet the test, i.e., even strong picture detail having an extent of only one or two sample periods (horizontally or vertically) may fail to pass the consistency test. Some of the undesired picture degradations may be avoided, however, by providing additional tests for flexure at various angles with respect to the $x$, $y$ axes along with the appropriate smoothing alternatives. Also if the number of points in the decision matrix is increased suitably a better balance between noise rejection and detail rejection may be obtained by requiring an agreement of $n-m$ subdecisions out of a total of $n$ before smoothing is applied.

Figure 8:
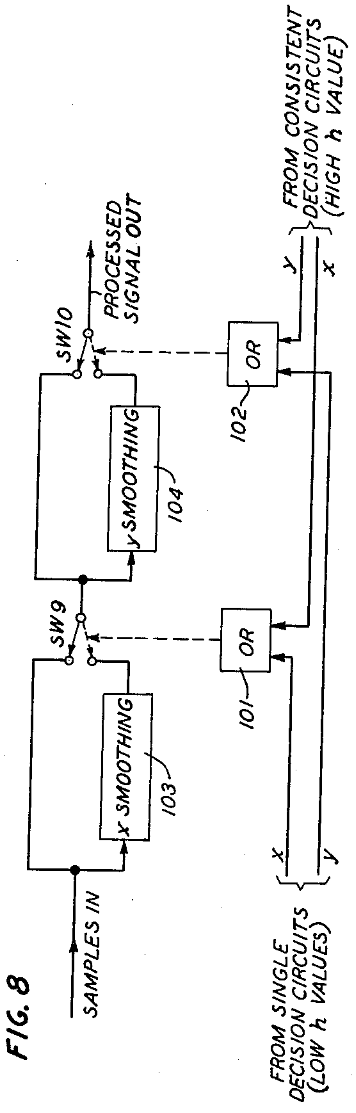
FIG. 8 is a block schematic diagram showing yet another processing system in accordance with the present invention.

Moreover, the consistent decision and single decision modes of operation may advantageously be used together to avoid some of the difficulties outlined above. Apparatus employing a composite decision system is shown in FIG. 8. In the apparatus of FIG. 8 flexure judgments are made simultaneously both according to the single decision criterion using a relatively high threshold value and according to the consistent decision criterion using a relatively low threshold value. The two types of decision signals, generated in apparatus (not shown) substantially identical with that previously described for the representative mode of operation, are combined, for example, in OR gates 101 and 102, to control switches SW9 and SW10 respectively. The switches are maintained normally in their upward position to pass signal samples directly and without smoothing. The switches are thrown to their downward position thus to accept samples smoothed in networks 103 or 104, respectively, only in the event that both decision signals, i.e., one developed according to a single decision criterion and one developed according to a consistent decision criterion, indicate that no significant flexure is represented by the sample in its particular environment. The high threshold single decision test prevents smearing of strong picture detail extending over only one or two picture samples and the low threshold consistent decision test prevents smearing of weak but extended picture detail. Once again transitory effects have been ignored, for clarity of exposition, in the above description of the cascaded arrangement of elements.

MULTIMODE SYSTEM

It is evident that even within the 3 x 3 matrix of samples shown in diagram of FIG. 1 there are many other possible subgroups of sample points which at any given instant may constitute a homogeneous or "simply-organized" family for the present value sample $S_{0,0}$, and thus represent a profitable smoothing domain. For example, if the matrix of FIG. 1 in translating in the direction of scanning approaches a vertical transition boundary so that the samples of columns A and B lie in one amplitude zone and the samples in column C lie in another, the six samples of columns A and B form a desired subgroup and the indicated smoothed substitute for $S_{0,0}$ is then formed as $\frac{1}{6}(A+B)$. There are, of course, various other ways in which diagnostic tests may be expanded to increase the running choice of subgroups. For example, tests can be made selective enough to cast out single "odd" points from otherwise simple geometrical zones defining or encompassing the smoothing subgroups. It has been found that one desirable way to elaborate the tests is to return to the original system set forth in Table I and described in connection with FIGS. 2 and 3, and provide additional tests and smoothing alternatives. A set of difference magnitudes may be formed as follows:

$$\begin{aligned}\Delta_l&=\tfrac{1}{3}\,|A-B|\\ \Delta_r&=\tfrac{1}{3}\,|B-C|\\ \Delta_u&=\tfrac{1}{3}\,|D-E|\\ \Delta_d&=\tfrac{1}{3}\,|E-F|\end{aligned}\qquad(5)$$

where $l$, $r$, $u$, and $d$ represent difference magnitudes in the left, right, up and down directions on the matrix.

These difference parameters are compared with the threshold which is arbitrarily taken to be the same as the parameter $h$ used as a reference in forming the previous parameter signals but which in general may assume a different value. The desired smoothing strategies are indicated in the following table for a 16 mode system:

*Table III.—Mode alternatives for 16-mode system*

X-OPERATION

| Test result | x-Smoothing extent | Smoothing function |
|---|---|---|
| $\Delta_x \leqq h$ | 3 point | Linear. |
| $\Delta_x, \Delta_r, \Delta_l > h$ | 1 point | None. |
| $\Delta_x > h$<br>$\Delta_r \leqq h$ | 2 point, right | Constant. |
| $\Delta_x < h$<br>$\Delta_l \leqq h$ | 2 point, left | Do. |

Y-OPERATION

| Test result | y-Smoothing extent | Smoothing function |
|---|---|---|
| $\Delta_y \leqq h$ | 3 point | Linear. |
| $\Delta_y, \Delta_u, \Delta_d > h$ | 1 point | None. |
| $\Delta_y > h$<br>$\Delta_u \leqq h$ | 2 point, up | Constant. |
| $\Delta_y > h$<br>$\Delta_d \leqq h$ | 2 point, down | Do. |

Figure 9:
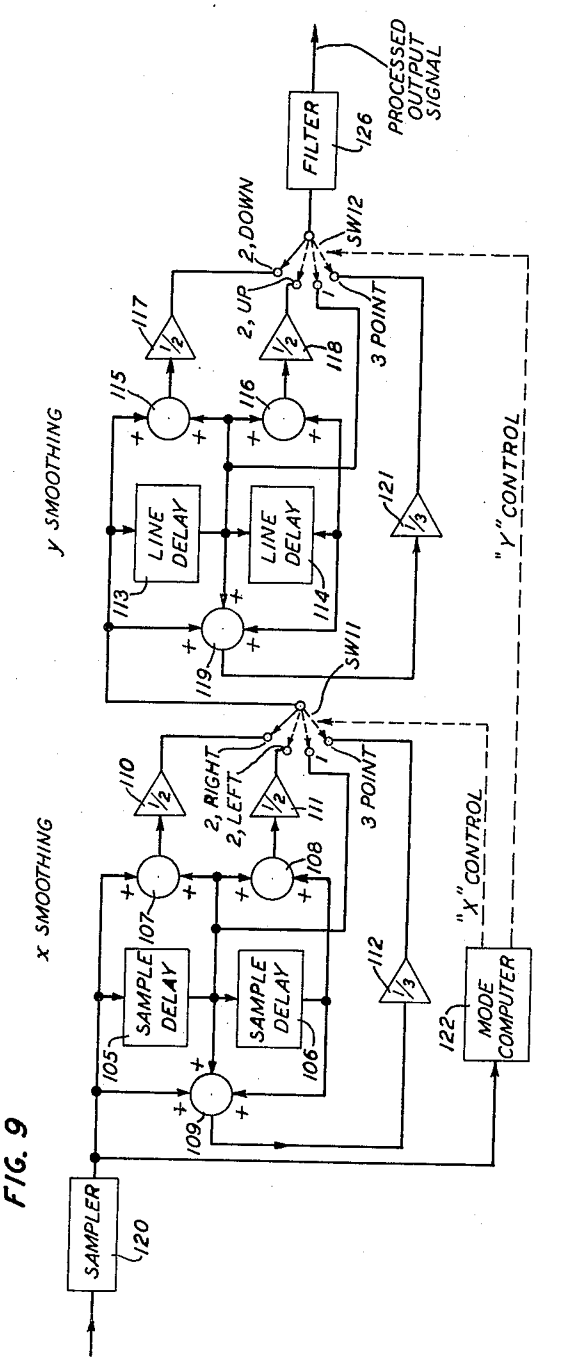
FIG. 9 is a block schematic diagram showing a multimode processing system embodying the principles of the invention.

Apparatus for implementing a multi-mode smoothing program is shown in FIG. 9. The $x$ and $y$ smoothing operations are performed, as before, in cascade. A total of sixteen processing alternatives are obtained by combining any of four possible $x$ operations with any of four possible $y$ operations. The results of combining the alternatives are listed in Table III along with the $x$ and $y$ extents which are included in the associated smoothing matrices. If, for example, the three-point selection occurs for both $x$ and $y$ the smoothing matrix will contain all nine points. If the $x$ and $y$ selections are two-point, right and two-point, up, respectively, the smoothing matrix will contain the four points 0,0, 0,1, −1.0 and −1.1. Here again the point designations are those illustrated in FIG. 1. For the reasons given previously, the cascaded operation does not yield precisely the results just described but rather yields results somewhat modified by transitory effects, e.g., effects resulting from a change in the $x$ decision. The operational description applies to the steady-state case in which the $x$ decision has remained unchanged for a number of samples in the vertical direction.

The four points representing smoothed value signals in the $x$ direction are formed in a manner similar to that described above in connection with the apparatus of FIG. 3. Samples derived from sampler 120 are passed through sample period delay lines 105 and 106 connected in cascade and subsequently combined in adders 107, 108 and 109 by twos and threes to form average value signals. The average of two samples produced in adder 107 is passed through one-half gain amplifier 110. The average of two samples produced in adder 108 is passed through one-half gain amplifier 111 and the average of three samples produced in adder 109 is passed through amplifier 112 arranged to have a gain of one-third. The unprocessed signal is taken from the output of sample delay line 105 and applied to one terminal of SW11. The average value signals are applied to the other terminals of SW11. The selected output of SW11 is similarly passed through line delay elements 113 and 114 connected in cascade to provide a distribution of sample values in the $y$ direction. The output of delay line 113 is applied to switch SW12 as the signal without vertical smoothing, and the outputs of the two adders 115 and 116 are passed through half gain amplifiers 117 and 118, respectively, to provide average value signals at the terminals of switch SW12. Similarly the combination of three samples produced at the output of adder 119 is passed through amplifier 121 whose gain is set at one-third to provide an average signal which also is applied to one terminal of SW12. Mode computer 122 is supplied with samples from sampler 120 and in a fashion similar to that previously described provides $x$ and $y$ control signals for activating respectively SW11 and SW12. The output of SW12 may then be passed through smoothing filter 126 to provide a processed output signal available for use.

The total number of points N in the smoothing domain may thus be 1, 2, 3, 4, 6, or 9. In the apparatus of FIG. 9 the smoothed function fitted to the noisy sample values is a plane for $N=9$; a plane parallel to either $x$ or $y$ axis for $N=6$; a straight line for $N=3$; and a constant for $N=4$, 2, or 1. When the flexure tests are negative the noise-free component of the local amplitude surface is thus assumed to be planar. The plane preferably is determined which fits the noisy ordinate values with the least squared error; and the ordinate value of this plane is used at the present sample location as a smoothed substitute for the original sample value. In the case of any symmetrical (about the present sample) matrix of points a least squared planar fit results in a simple average of the matrix sample values for the smoothed present sample. If a planar smoothing function is assumed for a non-symmetrical matrix comprising, for example, a six-point array including the points of columns A and B but not the points of column C, then the desired smoothed sample value depends only upon the samples in the center column B and not at all upon those in column A. For this 2 x 3 matrix the smoothing operation reduces to the problem of fitting a straight line to three points. Evidently no smoothing benefit is available along the $x$ axis since the two-point extent of the array in this direction is just adequate to specify slope. In order to obtain smoothing in both the $x$ and $y$ directions, a more constrained function is here postulated for fitting the points; either a constant value or a plane having zero slope along the $y$ axis. In either case the smoothed sample value becomes an average of the six sample values.

From the foregoing the following two basic principles can be stated; (1) in order to obtain smoothing in a given direction, the matrix extent (number of samples) in that direction should be great enough to provide a redundant specification of the postulated fitting function and (2) for a given matrix extent the degree of smoothing obtained will be greater the less complex the assumed functional form. The minimal matrix extents for achieving smoothing with constant, linear, quadratic (simple flexure), and cubic forms are 2, 3, 4, and 5 points, respectively.

The non-stationary, nonlinear operations described above are effective in selectively removing substantial amounts of noise from a video signal. While each processsing mode suppresses noise without picture blurring to some extent when operated alone, even better suppression is afforded by the use of other variants such as a combination consistent decision system of FIG. 6 and a multi-mode decision system of FIG. 9. A composite system of this sort provides superior performance particularly when the noise level is fairly high. If multiple frame storage is available an adaptation of the above-described porcessing modes to include frame-to-frame tests and smoothing may, of course, be employed. Moreover, the principles may readily be extended to other forms of communications signals. For example, combination of Nyquist periods and pitch periods of a speech signal may be utilized to establish appropriate measures of flexure and smoothing constraints. Various other modifications and variations will readily occur to one skilled in the art and may be employed to procure noise suppression without departing from the spirit and scope of the present invention.

What is claimed is:

1. Apparatus for discriminating against unwanted signal components in a communication signal comprising means for periodically sampling applied signals, means for detecting the presence of perceptually significant changes in said sampled signals, said detecting means including means for systematically comparing each sample of said signal in turn with a selected group of said samples, and means responsive to said detection means for modifying said applied signal in the absence of a detected significant difference between said sample and said selected group of samples.

2. Apparatus for removing spurious signals from a video signal comprising means for periodically sampling an applied video signal, means for detecting the presence of simply organized picture regions in said video signal, said detecting means including means for systematically comparing the weighted average of a selected group of juxtaposed samples including a given sample with weighted averages of a selected group of juxtaposed samples excluding said given sample, and means responsive to detected differences therebetween whose magnitudes are less than a pre-established value for modifying said video signals in accordance with one of a selected number of filtering modes.

3. Apparatus for removing spurious signals from a video signal as defined in claim 2 wherein said means for modifying said video signals comprises means for rejecting said given sample and substituting for it a selected signal comprising a weighted average of said samples.

4. A system for discriminating against extraneous signal components in a communication signal comprising means for periodically sampling an applied signal, means for detecting the presence of perceptually significant amplitude changes in said applied signal, said detecting means including means for systematically comparing the amplitude of each sample of said signal in turn with a linear combination of a selected group of samples, means for establishing a threshold of amplitude differences, and means responsive to said detection means for modifying the amplitude of said applied signal unless the detected differences between the amplitude of a given sample and the amplitude of the corresponding linear combination of samples exceed said threshold.

5. A noise eliminating system for video signals comprising means for detecting the presence of perceptually significant changes in applied video signals, said detecting means including means for continuously establishing a finite-difference approximation to the second derivative of the signal amplitude representing the picture brightness surface in at least one coordinate direction, means responsive to said detection means for modifying said applied video signals whenever the difference approximation is less than a pre-established difference threshold.

6. A noise eliminating system as defined in claim 5 wherein said finite-difference approximations are established both in the direction of picture scanning and in a direction having a component perpendicular to said direction of picture scanning.

7. A noise eliminating system for video signals comprising an input terminal supplied with video signals, means for periodically sampling said applied video signals, means for detecting the presence of perceptually significant amplitude changes in said video signals indicating a significant change in a given direction in the picture represented by said signals, means supplied with said samples for effectively averaging said samples over a selected number of sample intervals in said given direction, an output terminal, and switching means responsive to said detection means for supplying to said output terminal either said average video samples directly or said averaged samples.

8. In combination an input terminal supplied with video signals, means for periodically sampling said applied video signals, means for detecting the presence of perceptually significant amplitude changes in said video signals indicating significant changes in at least two directions in the picture represented by said video signals, first means supplied with said samples for effectively averaging said samples over a selected number of sample intervals in one of said directions, second means supplied with said samples for effectively averaging said samples over a selected number of sample intervals in the other one of said given directions, and switching means responsive to said detection means for supplying to said output terminal either said applied video samples directly or said samples averaged in said first direction, in said second direction, or in both directions.

9. A system for improving the signal-to-noise ratio of a message signal comprising means for comparing the amplitudes of a linear combination of incoming signal samples with a linear combination of samples selected in accordance with the characteristic structure of said message signal, means for establishing a predetermined threshold of amplitude differences, and means responsive to said comparing means for rejecting an incoming sample and substituting a selected average signal when the difference between the amplitude of said linear combination of samples and said linear combination of selected samples is less than said threshold value.

10. A noise eliminating system for message signals comprising means for comparing the amplitude of a first linear combination of incoming samples of a message signal with a second linear combination of samples selected in accordance with a structural characteristic of said message signal, means for establishing a predetermined threshold of amplitude differences, means for rejecting an incoming sample either when the magnitude of the difference between said first linear combination of samples and said second linear combination of samples is less than said threshold value or when the algebraic sign of said difference is not identical for a predetermined number of incoming samples in a selected group of incoming samples, and means for substituting for said rejected sample a smoothed approximation to the amplitude of said incoming sample.

11. A system for improving signal-to-noise ratio in a video signal comprising means for periodically sampling an applied signal, means for obtaining at least one measure of flexure of the local brightness surface represented by said applied signal, means for establishing at least one predetermined threshold of flexure amplitude, means for deriving from said video signal a plurality of smoothed signal samples, means for sequentially rejecting each applied sample unless one measure of flexure exceeds said threshold value, means for selecting that one of said smoothed samples that best preserves the flexure of said local brightness surface, and means for substituting, respectively, said selected sample for said rejected sample.

12. A system according to claim 11 wherein each of said plurality of smoothed samples comprises a prescribed average of samples juxtaposed with said rejected sample.

13. A system according to claim 11 wherein each of said plurality of smoothed samples comprises a prescribed average of weighted samples juxtaposed with said rejected sample.

14. A system according to claim 12 wherein at least one of said smoothed samples comprises a prescribed linear combination which includes previously derived smoothed samples.

15. A system for improving signal-to-noise ratio in a video signal comprising means for periodically sampling an applied signal, means for obtaining at least two measures of flexure of the local brightness surface represented by said applied signal, means for establishing a predetermined threshold of flexure amplitude, means for systematically rejecting applied samples unless all of said flexure measures exceed said threshold value, means for deriving from said video signal a plurality of samples representative of said rejected sample, means for selecting that one of said derived samples that best preserves the flexure of said local brightness surface, and means for substituting said selected sample for said rejected sample.

16. A system for removing extraneous signals from a video signal comprising means for periodically sampling an applied signal, means for obtaining a measure of flexure of the local brightness surface represented by said applied signal, means for establishing a predetermined threshold of flexure amplitude, means for deriving from a plurality of weighted samples, respectively, a plurality of linear combinations of samples each representative of one of said periodic samples, means for selecting that one of said derived samples that best preserves the flexure of said surface, means for substituting said selected sample for said one sample when said flexure measure is less than said threshold value, and means for retaining said one sample when said flexure measure exceeds said threshold value.

17. A system as defined in claim 16 wherein said means for selecting that one of said derived samples that best preserves said flexure comprises means for comparing each incoming sample with a linear combination of other incoming samples to produce a finite-difference approximation to the second derivative of the signal amplitude representing said local brightness surface in at least one coordinate direction.

18. Apparatus for eliminating spurious signals from correlated communication signals comprising means for periodically sampling applied signals, means for detecting the presence of perceptually significant changes in said samples, said detecting means including means for systematically comparing a linear combination of selected samples including a given sample in turn with a linear combination of selected samples excluding said given sample, means for establishing a first threshold of amplitude differences, and means for producing an indication when the differences between the combination of samples including said given sample and said combination of samples excluding said given sample is less than said first threshold; means for detecting the occurrence of perceptually significant changes in a selected number of samples, said last-named detecting means including means for systematically forming a number of linear combinations of applied samples, means for forming a number of linear combinations of samples selected in accordance with a structural characteristic of said applied signal, means for establishing a second threshold of amplitude differences, and means for comparing said linear combinations with said threshold to produce an indication of the differences therebetween either when the magnitude of the difference is less than said second threshold or when the algebraic sign of said difference is not identical for a predetermined number of applied samples; and means responsive to both of said indications for modifying said corresponding sample in the absence of indicated differences in either one or both of said detection means.

19. Apparatus as defined in claim 18 wherein said means responsive to both of said indications for modifying said corresponding sample includes a logical OR gate supplied with said indications, and means responsive to the output of said OR gate for controlling said modifying means.

20. In combination, means for obtaining a measure of perceptually significant features of a communication signal, and means responsive to said measure for modifying said signal when said measure is less than a prescribed value.

References Cited in the file of this patent

UNITED STATES PATENTS

| | | |
|---|---|---|
| 2,710,347 | Brady | June 7, 1955 |
| 2,841,645 | Stateman | July 1, 1958 |